United States Patent
Franzen et al.

(10) Patent No.: US 11,540,447 B2
(45) Date of Patent: Jan. 3, 2023

(54) PREDICTIVE CROP CHARACTERISTIC MAPPING FOR PRODUCT APPLICATION

(71) Applicant: DEERE & COMPANY, Moline, IL (US)

(72) Inventors: Devin M. Franzen, Altoona, IA (US); Austin R. Roepke, Ottumwa, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 464 days.

(21) Appl. No.: 16/717,266

(22) Filed: Dec. 17, 2019

(65) Prior Publication Data

US 2021/0176918 A1   Jun. 17, 2021

(51) Int. Cl.
*A01F 15/08* (2006.01)
*A01F 15/10* (2006.01)

(52) U.S. Cl.
CPC .... *A01F 15/0816* (2013.01); *A01F 2015/108* (2013.01)

(58) Field of Classification Search
CPC ............ A01F 15/0816; A01F 2015/108; A01F 29/04; A01D 89/00; A01D 41/1277; A01D 41/1272; A01D 41/1278; A01D 34/006; A01D 34/008
See application file for complete search history.

(56) References Cited

U.S. PATENT DOCUMENTS

| | | | |
|---|---|---|---|
| 4,918,910 A * | 4/1990 | Sheehan | A01F 15/0816 100/45 |
| 5,995,895 A | 11/1999 | Watt et al. | |
| 6,505,146 B1 | 1/2003 | Blackmer | |
| 7,900,557 B2 * | 3/2011 | Freeman | A01F 15/0816 56/341 |
| 7,930,085 B2 | 4/2011 | Anderson et al. | |

(Continued)

FOREIGN PATENT DOCUMENTS

EP   3085221 A1   10/2016

OTHER PUBLICATIONS

Extended European Search Report and Written Opinion issued in European Patent Application No. 20211131.6, dated May 3, 2021, in 06 pages.

(Continued)

*Primary Examiner* — Alicia Torres

(57) ABSTRACT

A method of harvesting a crop material includes gathering the crop material with a harvesting implement as the harvesting implement moves along an initial path through a field. A location and a value of a characteristic of the gathered crop material is sensed at a plurality of intervals. A set of estimated values of the characteristic throughout the field is generated based on the sensed location and characteristic of the crop material at each of interval. A value of the characteristic of the crop material ahead of the harvesting implement is predicted as the harvesting implement moves along a harvest path, based on the set of estimated values of the characteristic of the crop material throughout the field. A function of the harvesting implement may be controlled based on the predicted value of the characteristic ahead of the pick-up.

1 Claim, 3 Drawing Sheets

(56) References Cited

U.S. PATENT DOCUMENTS

| | | | | |
|---|---|---|---|---|
| 8,567,311 B2* | 10/2013 | Kraus | ............... | A01F 15/0816 100/45 |
| 8,656,830 B2* | 2/2014 | Kraus | ............... | A01F 15/0816 100/88 |
| 8,855,937 B2* | 10/2014 | Lindores | ............ | A01B 79/005 703/11 |
| 9,807,940 B2 | 11/2017 | Roell et al. | | |
| 10,201,121 B1 | 2/2019 | Wilson | | |
| 2011/0270723 A1 | 11/2011 | O'Neil | | |
| 2012/0103205 A1* | 5/2012 | Kraus | .................. | A01F 15/08 100/2 |
| 2015/0223416 A1 | 8/2015 | Eng et al. | | |
| 2015/0305238 A1 | 10/2015 | Klausmann et al. | | |
| 2016/0309656 A1* | 10/2016 | Wilken | ............. | A01D 41/127 |
| 2017/0276623 A1* | 9/2017 | MacNeill | ........... | G01N 27/605 |
| 2018/0116124 A1* | 5/2018 | Murray | ............. | A01B 69/008 |
| 2018/0303031 A1* | 10/2018 | Araki | ................. | A01D 34/008 |
| 2019/0129435 A1* | 5/2019 | Madsen | .............. | B62D 6/001 |

OTHER PUBLICATIONS

Dropsaver, Hay preservative and applicator systems, New Holland Brochure, retrieved from internet <http://harvesttec.com/wp-content/uploads/2016/12/NH-brochure-2017-lo-res.pdf>, 16 pages.

Dohrmann Hay Guard Mounted Hay Baler Applicators, retrieved from internet <https://www.cashmans.com/product/dohrmann-applicators/>, 2 pages.

* cited by examiner

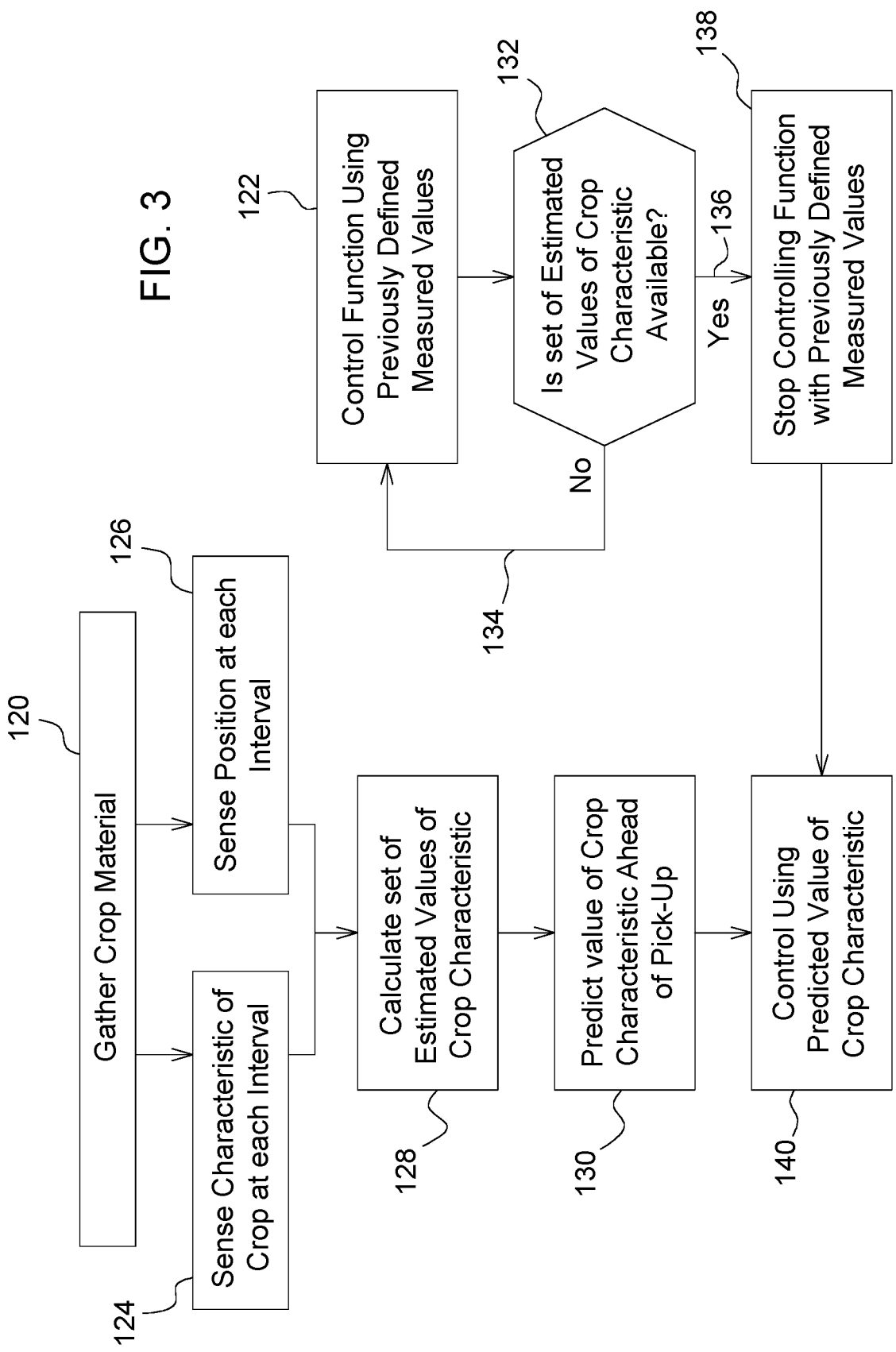

PREDICTIVE CROP CHARACTERISTIC MAPPING FOR PRODUCT APPLICATION

TECHNICAL FIELD

The disclosure generally relates to a method of harvesting crop material, and a harvesting system therefor.

BACKGROUND

Crop material, such as but not limited to hay, is often gathered and formed into a bale with a harvesting implement, e.g., a baling machine. For example, the harvesting implement may include, but is not limited to, a round baler for making cylindrical shaped bales, or a square baler for making rectangular shaped bales. It should be appreciated that the harvesting implement may be configured differently than a baler, and instead, be configured for other crop materials. For example, the harvesting implement may be configured as a forage harvester or a combine. In order to store crop material, such as hay, it is often desirable to allow the crop material to dry in the field for a period of time after being cut, and prior to being baled. Typically, the crop material is dried to a moisture content of less than twenty percent. Unless completely covered with a solid wrap material, crop material that is baled with a moisture content greater than approximately twenty percent may spoil or mold.

Under some situations, in which the crop material has a moisture content that is higher than approximately twenty percent, a crop preservative may be applied to the crop material as the crop material is gathered and processed by the harvesting implement, e.g., a baler, and just before being formed into the bale. The crop preservative minimizes or prevents mold growth and/or spoilage. Some systems apply the crop preservative across the entire field, regardless of whether or not all regions of the field require the crop preservative. These systems result in excess crop preservative usage, which is costly. Other systems detect the moisture content of a bale after it is formed, and adjust the crop preservative usage retroactively, i.e., these other systems adjust the crop preservative for the crop currently being baled based on the condition of the crop that was previously baled. These other systems are retroactive in nature, and do not accurately predict the moisture content of the crop that is currently being baled, i.e., that is in front of the harvesting implement.

SUMMARY

A method of harvesting a crop material is provided. The method includes gathering the crop material with a pick-up of a harvesting implement as the harvesting implement moves along an initial path through a field. A value of a characteristic of the gathered crop material is sensed at each of a plurality of intervals with a characteristic sensor. A location of the harvesting implement on the field is sensed at each of the plurality of intervals with a position sensor. A set of estimated values of the characteristic of the crop material throughout the field is generated with a controller. The set of estimated values of the characteristic is generated based on the sensed characteristic of the crop material and the sensed location of the harvesting implement at each of the plurality of intervals. A value of the characteristic of the crop material ahead of the pick-up of the harvesting implement is predicted with the controller as the harvesting implement moves along a harvest path, based on the set of estimated values of the characteristic of the crop material throughout the field. A function of the harvesting implement may be controlled based on the predicted value of the characteristic of the crop material ahead of the pick-up.

In one aspect of the method of baling the crop material, the step of generating the set of estimated values of the characteristic of the crop material throughout the field includes generating a predictive map of the field providing estimated values of the crop characteristic throughout the field. The predictive map may be generated by modeling the field using the sensed characteristic of the crop material and the sensed location of the harvesting implement at each of the plurality of intervals.

In one aspect of the method of baling the crop material, sensing the location of the harvesting implement at each of the plurality of intervals may include determining the location on the field of the crop material from which the characteristic of the crop material was sensed at each respective interval. The characteristic of the crop material may be sensed after the crop is gathered, such that there is little variation between the location of the harvesting implement on the field at the time the crop material is gathered and the location of the harvesting implement on the field at the time the characteristic of the crop material is sensed. However, it is contemplated that the characteristic of the crop material may be sensed after the crop material has been formed into a bale, such that there is a distance variation between the location of the harvesting implement on the field at the time the crop material is gathered and the location of the harvesting implement on the field at the time the characteristic of the crop material is sensed. In order to provide an accurate mapping of the characteristic of the crop material in the field, when there is a distance variation, then the method contemplates determining the location on the field from which the characteristic of the crop material was sensed at a respective interval.

In another aspect of the method of baling the crop material, the characteristic of the crop material may include a moisture content of the crop material, and the function of the harvesting implement may include, but is not limited to an additive applicator. The step of controlling the function of the harvesting implement may include controlling the additive applicator to add an additive to the crop material. The additive may include, but is not limited to, a crop preservative to prevent or limit mold and/or spoilage of the crop material. Similarly, controlling the function of the harvesting implement may include disengaging the additive applicator when not crop preservative is required, thereby minimizing the amount of crop preservative used and the cost associated therewith.

In one aspect of the method of baling the crop material, the initial path through the field is defined to develop a data set of the sensed values of the characteristic of the crop material and the sensed location of the harvesting implement at the plurality of intervals. The initial path is defined to provide sufficient data to generate the set of estimated values of the characteristic of the crop material throughout at least a portion of the field. Accordingly, the initial path may include an initial portion of the field that is used to generate data sufficient to map the characteristic of the crop material throughout the field, followed by a harvest path by which the remainder of the crop material in the field is gathered and baled.

In one aspect of the method of baling the crop material, prior to controlling the function of the harvesting implement using the predicted value of the crop material ahead of the pick-up, the function of the harvesting implement may be controlled using a previously defined set of measured values of the characteristic of the crop material. The previously defined set of measured values of the characteristic may include, for example, the measured values from the previous harvest. The previously defined set of measured values may be used prior to obtaining sufficient data to generate the set of estimated values of the characteristic of the crop material throughout the field. Once sufficient data has been obtained, and the set of estimated values of the characteristic of the crop material has been generated, then the controller may use the set of estimated values to predict the characteristic of the crop material ahead or in front of the pick-up of the harvesting implement.

In one aspect of the method of baling the crop material, the value of the characteristic of the gathered crop material is continuously sensed as the harvesting implement moves along the harvest path through the field. Similarly, the location of the harvesting implement on the field is continuously sensed as the harvesting implement moves along the harvest path through the field. By doing so, the set of estimated values of the characteristic of the crop material may be continuously generated and/or updated as the harvesting implement moves along the harvest path through the field. It should be appreciated that the accuracy of the set of estimated values of the characteristic of the crop material improves as the number data sets increases. Accordingly, by continuously sensing the characteristic and the location as the implement moves along not only the initial path, but also the harvest path, the accuracy of the set of estimated values may be improved.

In one aspect of the method of baling the crop material, the function of the harvesting implement may be controlled automatically by the controller based on the predicted value of the crop material ahead of the pick-up is further. In another embodiment, the function of the harvesting implement may be controlled manually by an operator, based on the predicted value of the crop material ahead of the pick-up of the harvesting implement.

In another aspect of the method of baling the crop material, the harvesting implement includes a baling chamber, with the crop being moved from the pick-up to the baling chamber, wherein the harvesting implement forms the crop material into a bale.

A harvesting system is also provided. The harvesting system includes a harvesting implement operable to move along an initial path through a field. The harvesting implement includes a pick-up for gathering crop material as the harvesting implement moves along the initial path. A characteristic sensor is positioned to sense a value of a characteristic of the gathered crop material at each of a plurality of intervals. A position sensor is operable to determine a location on the field of the crop material from which the characteristic of the gathered crop material was sensed at each respective interval. A controller is disposed in communication with the characteristic sensor and the position sensor. The controller includes a processor and a memory having characteristic prediction algorithm stored thereon. The processor is operable to execute the characteristic prediction algorithm to receive data from the characteristic sensor related to the value of the characteristic of the gathered crop at each interval, and receive data from the position sensor related to the location on the field of the crop material from which the value of the characteristic of the gathered crop was sensed at each respective interval. The controller is operable to then generate a set of estimated values of the characteristic of the crop material throughout the field, based on the data received from the characteristic sensor and the position sensor at each of the plurality of intervals. The controller may then predict a value of the characteristic of the crop material ahead of the pick-up of the harvesting implement as the harvesting implement moves along a harvest path, based on the set of estimated values of the characteristic of the crop material throughout the field.

In one aspect of the baling system, the processor is operable to execute the characteristic prediction algorithm to control a function of the harvesting implement based on the predicted value of the characteristic of the crop material ahead of the pick-up. The characteristic of the crop material may include, but is not limited to, a moisture content of the crop material. The function of the harvesting implement may include, but is not limited to, a preservative applicator.

In one aspect of the disclosure, prior to controlling the function of the harvesting implement using the predicted value of the crop material ahead of the pick-up, the processor is operable to execute the characteristic prediction algorithm to control the function of the harvesting implement using a previously defined set of measured values of the characteristic of the crop material. The previously defined set of measured values of the characteristic of the crop material may be saved on the memory of the controller.

In another aspect of the disclosure, the processor is operable to execute the characteristic prediction algorithm to model the field using the sensed characteristic of the crop material and the sensed location on the field of the crop material from which the value of the characteristic of the gathered crop was sensed at each respective interval to generate a predictive map of the field. The predictive map of the field provides estimated values of the crop characteristic throughout the field.

Accordingly, the harvesting system and the method described herein enable predictive control of the function of the harvesting implement, based on estimated values of the crop characteristic. For example, the application of the crop preservative may be based on the predicted moisture content of the crop material ahead of the pick-up.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic flow chart representing a method of baling crop material.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
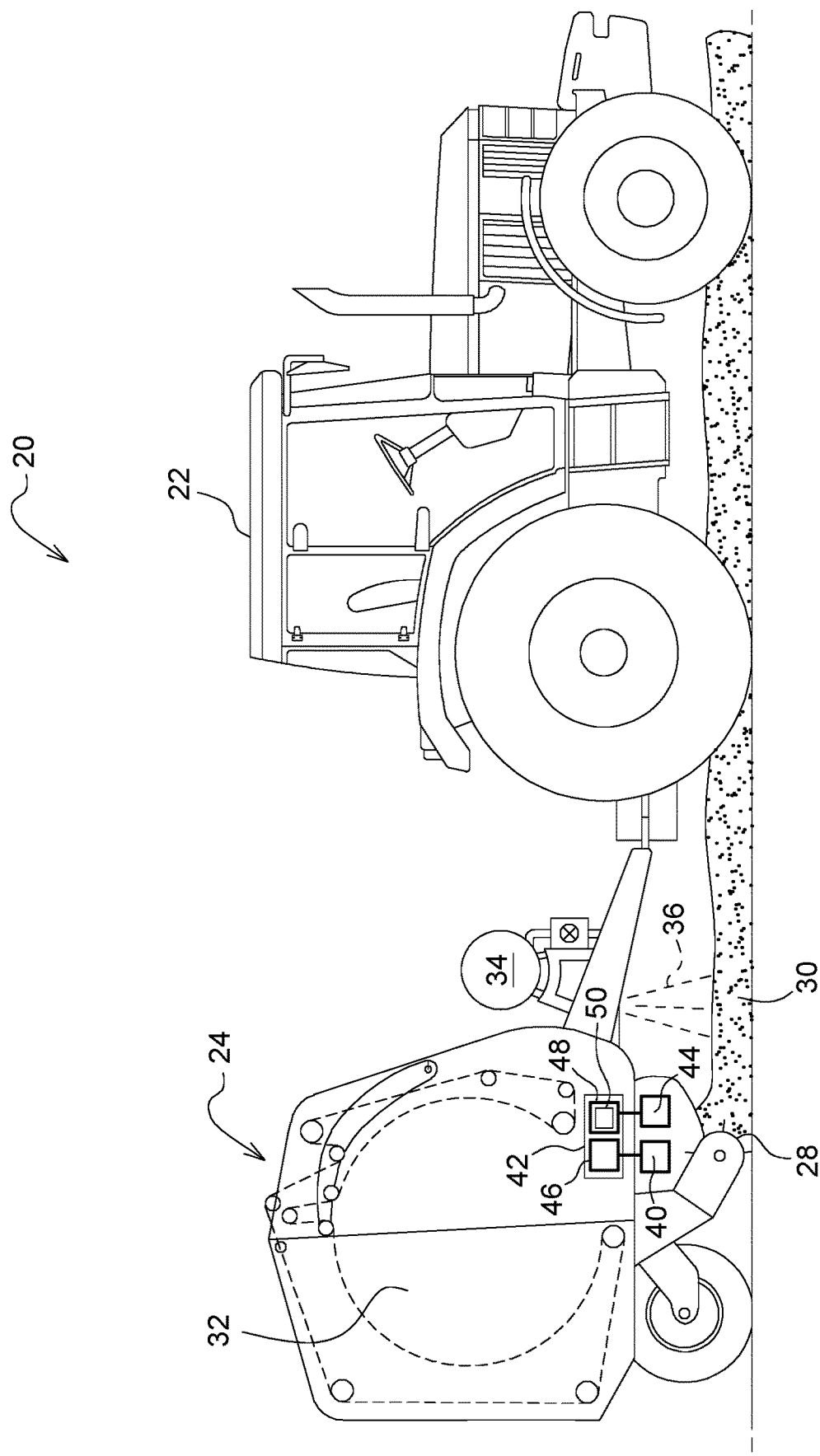
FIG. 1 is a schematic side view of a harvesting system.

Referring to the Figures, wherein like numerals indicate like parts throughout the several views, a harvesting system is generally shown at 20. Referring to FIG. 1, the harvesting system 20 includes a tractor 22 pulling a harvesting implement 24. In other embodiments, however, the harvesting system 20 may include a self-propelled implement, including both a traction unit and the harvesting implement 24 combined into a single vehicle.

Referring to FIG. 1, the tractor 22 pulls the harvesting implement 24 through a field 26 (shown in FIG. 2) to harvest a crop material 30. In the example embodiment described herein, the harvesting implement 24 is embodied and referred to as a baler 24 operable to harvest hay or other similar crop material 30. However, it should be appreciated that the harvesting implement 24 may be configured differently than the example embodiment shown and described herein and used to harvest crop materials 30 other than hay. As such, the teachings of this disclosure are not limited to a baler for baling hay and may be applied to other crop harvesting applications and implements, such as but not limited to a forage harvester or a combine.

The example embodiment of the baler 24 described herein may include any type of baler 24, including but not limited to a large square baler 24, a small square baler 24, or a round baler 24. Unless otherwise described herein, the baler 24 may operate as known in the art. Generally, referring to FIG. 1, the baler 24 includes a pick-up 28 located at a forward end of the baler 24, which gathers the crop material 30 from the ground. The pick-up 28 feeds the gathered crop material 30 to a baling chamber 32, which forms the crop material 30 into the bale, e.g., either a square bale or a round bale. The specific features and operation of the baler 24 related to gathering and forming the crop material 30 into bales are known to those skilled in the art, are not pertinent to the teachings of this disclosure, and are therefore not describe in greater detail herein.

The baler 24 may include other systems and functions as well, such as a function dependent upon at least one characteristic of the crop material 30. For example, functions that are dependent or controllable based on the characteristic of the crop material 30 may include, but are not limited to, a pre-cutter (not shown) for further processing the crop material 30, an additive applicator 34 for applying an additive, such as but not limited to a crop preservative 36, to the crop material 30 prior to the crop material 30 entering the baling chamber 32, or tensioning panels for forming a large square bale. The pre-cutter may be controlled based on the cut length of the crop material 30 being gathered, to adjust further processing of the crop material 30. The additive applicator 34 may be controlled based on the moisture content of the crop material 30 being gathered, to adjust the application rate of the additive, such as the crop preservative 36. A tension or force applied by the tensioning panels may be adjusted based on the moisture content of the crop material 30. It should be appreciated that the function of the baler 24 dependent upon the characteristic of the crop material 30 may vary from the examples provided herein.

The baler 24 is operable to move along an initial path 38 and a harvest path 39 through the field 26. In the example embodiment, the tractor 22 draws the baler 24 through the field 26 along either the initial path 38 or the harvest path 39. However, it should be appreciated that the baler 24 may be drawn by some other vehicle, or as noted above, may be a self-propelled vehicle. The pick-up 28 gathers the crop material 30 as the baler 24 moves in the field 26 along the initial path 38 or the harvest path 39. The pick-up 28 feeds the crop material 30 into the baling chamber 32, which forms the crop material 30 into a shape, and binds the formed shape together with twine or a wrap material to form the bale.

The baler 24 includes a characteristic sensor 40. The characteristic sensor 40 is positioned and operable to sense a characteristic and/or a value of the characteristic of the crop material 30 gathered by the pick-up 28 as the baler 24 moves along the initial path 38 or the harvest path 39. The characteristic may include, but is not limited to, a moisture content of the crop material 30, an ash content of the crop material 30, a cut length of the crop material 30, a conditioning percentage of the crop material 30, etc. The specific type and/or operation of the characteristic sensor 40 is dependent upon the specific characteristic of the crop material 30 being sensed. Example types of sensors may include, but are not limited to, moisture sensors, optical sensors, cameras, capacitance sensors, etc. In the example embodiment described herein, the characteristic sensor 40 is a moisture sensor operable to sense a moisture content of the crop material 30. The specific type, function, and operation of various types of the characteristic sensor 40, such as the moisture sensor of the example embodiment, are known to those skilled in the art, not pertinent to the teachings of this disclosure, and are therefore not described in greater detail herein.

The characteristic sensor 40 may be positioned at a suitable location to sense the desired value of the characteristic of the crop material 30. The location of the characteristic sensor 40 on the harvesting implement 24, e.g., the baler 24, may depend upon the specific characteristic being sensed. In the example embodiment described herein, the characteristic sensor 40 (i.e., the moisture sensor) may be positioned at or near the pick-up 28 to sense the moisture of the crop material 30 as the crop material 30 is being gathered. Alternatively, the moisture sensor of the example embodiment any be positioned in or near the baling chamber 32 to sense the moisture content of the crop material 30 while or after being formed into the bale.

The characteristic sensor 40 senses data and communicates the data to a controller 42. The data may include information related to the value of the characteristic at each of a plurality of intervals. The intervals may include, but are not limited to, time intervals or distance intervals. In the example embodiment described herein, the characteristic sensor 40 senses data related to the moisture content of the crop material 30 at each of the intervals and communicates that data for each interval to the controller 42. The data may include a signal representing an actual moisture content or may include other information that enables the controller 42 to calculate the value of the characteristic of the crop material 30.

The harvesting system 20 further includes a position sensor 44. In the example embodiment described herein, the position sensor 44 may be disposed on the tractor 22 or the harvesting implement 24, e.g., the baler 24. The position sensor 44 is operable to determine a location on the field 26 of the baler 24 and/or the crop material 30 from which the characteristic of the gathered crop material 30 was sensed at each respective interval. Accordingly, every interval at which the characteristic sensor 40 senses data related to the characteristic of the crop material 30, the position sensor 44 senses data related to the position of the crop material 30 in the field 26 from which the crop characteristic was sensed.

As such, the position data identifies the location on the field 26 of the data related to the characteristic of the crop material 30.

The position sensor 44 communicates the data related to the position in the field 26 to the controller 42. The data may include the actual position, e.g., coordinates, for each interval and/or may include data that enables the controller 42 to calculate the location or position on the field 26. For example, if the position sensor 44 is located on the baler 24, at or near the pick-up 28 so that the position sensor 44 senses the data related to the position on the field 26 as the pick-up 28 gathers the crop material 30, then the data may reflect that actual position in the field 26 of the crop material 30 from which the characteristic of the crop material 30 is sensed.

If the position sensor 44 is located somewhere other than at the pick-up 28, e.g., on the tractor 22, then the controller 42 may need to apply a location correction to correct for the distance between the location on the field 26 related to the data sensed by the position sensor 44 and the location on the field 26 of the pick-up 28 of the baler 24. Similarly, if the characteristic sensor 40 is not located at or near the pick-up 28, then the controller 42 may need to apply a travel correction to correct for the distance travelled by the baler 24 prior to the characteristic sensor 40 sensing the data related to the crop characteristic. For example, if the baler 24 includes a moisture sensor located in the baling chamber 32, then the data related to the characteristic of the crop material 30, e.g., the moisture content, is sensed at a time after the crop material 30 was gathered from the field 26. In this time period between when the pick-gathered the crop material 30 in the field 26 and when the characteristic sensor 40 senses the data related to the characteristic of the crop material 30, then bale may have traveled a distance from the location on the field 26 from which the crop material 30 originated. As such, the controller 42 must relate both the data related to the position of the crop characteristic and the value of the crop characteristic to the position on the field 26 from which the crop material 30 originated, by applying a travel correction based on the time and travel route traversed since the crop material 30 was gathered.

The position sensor 44 may include, but is not limited to, a Global Positioning System (GPS) receiver. As understood by those skilled in the art, the GPS receiver receives data from multiple satellites and uses that data to calculate the position of the GPS receiver. The specific operation of the GPS receiver is well known to those skilled in the art, not pertinent to the teachings of this disclosure, and is therefore not described in greater detail herein. Additionally, the position sensor 44 may include a device other than the GPS receiver that is capable of calculating and tracking the movement of the harvesting implement 24 over and through the field 26.

As described above, the harvesting system 20 includes the controller 42. The controller 42 may be located in the baling implement, in the tractor 22, or at some other remote location. The controller 42 is disposed in communication with the characteristic sensor 40 and the position sensor 44, and is operable to receive that data from the characteristic sensor 40 related to the characteristic of the crop material 30, and also receive the data from the position sensor 44 related to the position in the field 26 from which the crop material 30 originated for each sample interval. The controller 42 may be linked to the position sensor 44 and the characteristic sensor 40 to receive data therefrom in any suitable manner, such as but not limited to a wired connection, a wireless connection, a cloud connection, etc. The specific manner in which the controller 42 is linked and communicates with both the position sensor 44 and the characteristic sensor 40 is not pertinent to the teachings of the disclosure, is understood by those skilled in the art, and is therefore not described in greater detail herein.

The controller 42 may be referred to as a computer, a specialized computer, an implement controller, a vehicle controller, a control module, a vehicle control module, etc. The controller 42 includes a processor 46, a memory 48, and all software, hardware, algorithms, connections, sensors, etc., necessary to manage and control functions of the harvesting implement 24, e.g., the baler 24. As such, a method may be embodied as a program or algorithm operable on the controller 42. It should be appreciated that the controller 42 may include any device capable of analyzing data from various sensors, comparing data, making the necessary decisions required to control the operation of the harvesting implement 24 and executing the required tasks necessary to control the operation of the harvesting implement 24.

The controller 42 may be embodied as one or multiple digital computers or host machines each having one or more processors 46, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 48 may include any non-transitory/tangible medium which participates in providing data or computer-readable instructions. Memory 48 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory 48 devices such as flash memory.

The controller 42 includes the tangible, non-transitory memory 48 on which are recorded computer-executable instructions, including a characteristic prediction algorithm 50. The processor 46 of the controller 42 is configured for executing the characteristic prediction algorithm 50. The characteristic prediction algorithm 50 implements a method of harvesting the crop material 30.

Figure 2:
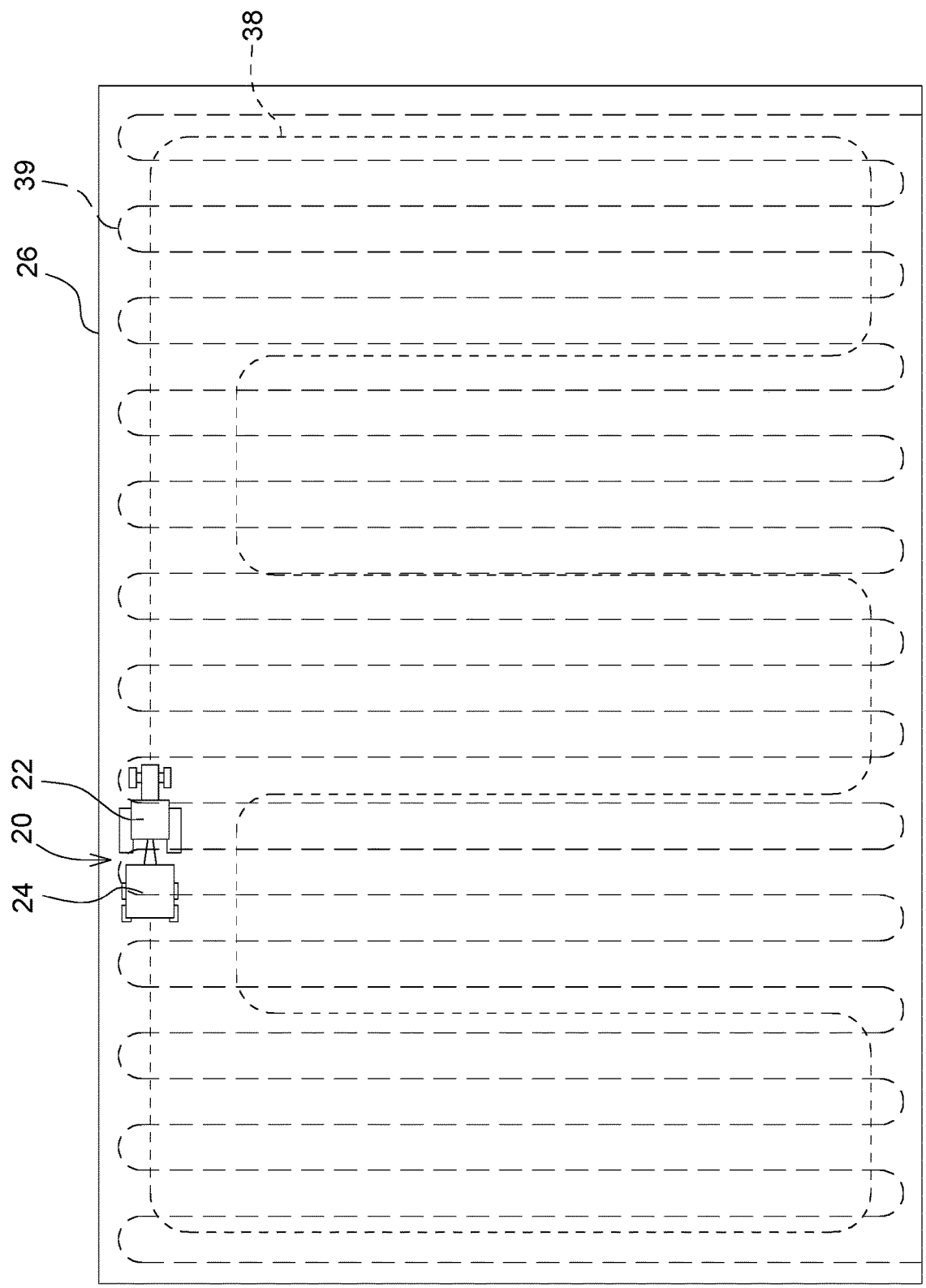
FIG. 2 is a schematic plan view of a field showing an initial path and a harvest path of the harvesting system.

Referring to FIG. 2, the method of harvesting the crop material 30 includes defining the initial path 38 through the field 26. The initial path 38 is defined in such a manner to only cover enough of the field 26 sufficient to develop a data set of the sensed values of the characteristic of the crop material 30 and the sensed location of the baler 24 at the plurality of intervals sufficient to represent at least a portion if not the entire field 26. The data set generated by the initial path 38 may be used, as described in greater detail below, to generate a set of estimated values of the characteristic of the crop material 30 throughout the portion or entirety of the field 26. The initial path 38 may include, for example, a few spaced apart passes intended to gather representative data related to the crop material 30 in the field 26.

The harvest path 39 through the field 26 may also be defined. The harvest path 39 defines a route through the field 26 by which the remainder of the crop material 30, which was not gathered along the initial path 38, may be gathered.

Referring to FIG. 3, once the initial path 38 is defined, the harvesting implement 24 is moved along the initial path 38 through the field 26 to gather the crop material 30 with the pick-up 28 of the baler 24. The step of gathering the crop material 30 with the pick-up 28 is generally indicated by box 120 in FIG. 3. As described above, the baler 24 includes at least one function that may be controlled based on the characteristic of the crop material 30, such as but not limited to the application of the crop preservative 36 with the additive applicator 34. During the initial phase of the process, in which the baler 24 is moved along the initial path 38, one or more functions of the baler 24, such as but not limited to the application of the crop preservative 36 with the additive applicator 34, may be controlled using a previously defined set of measured values of the characteristic of the crop material 30. The step of controlling the function of the baler 24, e.g., the additive applicator 34, with the previously defined set of measured values is generally indicated by box 122 in FIG. 3. The set of measured values of the characteristic of the crop material 30 may be values of the characteristic and their associated location in the field 26 derived during a previous harvesting operation, and saved in the memory 48 of the controller 42. It should be appreciated that the set of measured values of the characteristic of the crop material 30 may reflect the actual values of the crop characteristic at the time of a previous harvesting, and not at the current harvest time. Alternatively, during the initial phase of the process, in which the baler 24 is moved along the initial path 38, the functions of the baler 24 may be controlled by some other process, such as manually or be a pre-set default value.

As the baler 24 moves through the field 26 along the initial path 38 and gathers the crop material 30 from the field 26, the characteristic sensor 40 senses a value of the characteristic of the gathered crop material 30 at each of the plurality of intervals. The step of sensing the characteristic of the crop material 30 at each interval is generally indicated by box 124 in FIG. 3. As noted above, the specific characteristic may include any characteristic of the crop material 30 upon which a function of the baler 24 may be adjusted or controlled. In the example embodiment described herein, the characteristic is defined as the moisture content of the crop material 30. However, it should be appreciated that the characteristic of the crop material 30 may differ from the example embodiment of moisture content.

The characteristic sensor 40 senses the characteristic of the crop material 30 at each interval. As noted above, the interval may be defined in terms of time or distance. For example, the interval may be defined to equal one second, two seconds, etc. Alternatively, the interval may be defined to equal every 10 feet travelled, 20 feet travelled, etc. In one embodiment, the characteristic sensor 40 may sense the characteristic of the crop material 30 only through the initial path 38. However, in other embodiments, the characteristic sensor 40 may sense the characteristic of the crop material 30 continuously through both the initial path 38 and the harvest path 39.

As noted above, the characteristic sensor 40 detects data related to the specific characteristic of the crop material 30 being monitored. In the example embodiment, the characteristic is moisture content. Accordingly, in the example embodiment, the characteristic sensor 40 senses or detects data related to the moisture content of the crop material 30. The data is then communicated to the controller 42, which in turn receives the data from the characteristic sensor 40 related to the value of the characteristic of the gathered crop at each interval. The data may include the actual moisture content, or other information that may be used by the controller 42 to calculate the moisture content.

In addition to sensing the data related to the characteristic of the crop material 30 at each respective interval, the baler 24 further senses a location of the baler 24 on the field 26 at each of the plurality of intervals with the position sensor 44. The step of sensing the location at each interval is generally indicated by box 126 in FIG. 3. As noted above, the interval may be defined in terms of time or distance. For example, the interval may be defined to equal one second, two seconds, etc. Alternatively, the interval may be defined to equal every 10 feet travelled, 20 feet travelled, etc. In one embodiment, the position sensor 44 may sense the position of the baler 24 at each interval only through the initial path 38. However, in other embodiments, the position sensor 44 may sense the position of the baler 24 continuously through both the initial path 38 and the harvest path 39.

As noted above, the position sensor 44 detects data related to the location of the baler 24 at each respective interval. The position data is then communicated to the controller 42, which in turn receives the position data from the position sensor related to the position of the baler 24 at each interval. The data may include the actual position of the pick-up 28 of the baler 24 when the characteristic of the crop material 30 is sensed, or may include other information that may be used by the controller 42 to calculate the position of the pick-up 28 of the baler 24 when the characteristic of the crop material 30 was sensed.

For example, if the characteristic sensor 40 is positioned on the baler 24 to sense the characteristic of the crop material 30 at a location other than at the pick-up 28, then an amount of time may pass between the time when the crop material 30 is gathered and the time when the characteristic of the crop material 30 is sensed. In the amount of time, the baler 24 may have traveled from the location in the field 26 from which the crop material 30 originated and was gathered from. As such, when the characteristic of the crop material 30 and the position are sensed at the interval, the data is not directly related to the location in the field 26 from which the crop material 30 tested at that respective interval originated. In this situation, the data related to the position of the baler 24 in the field 26 may include information that allows the controller 42 to calculate or otherwise determine where in the field 26 the baler 24 was located when the crop material 30 was gathered by the pick-up 28 for that respective interval. The data may include, for example, a speed of movement, a distance traveled, a time between when the crop material 30 was gathered and the time when the characteristic was sensed, etc. The controller 42 may then use the data to calculate or otherwise determine the location on the field 26 from which the crop material 30 originated for each respective test interval.

In the example embodiment, the crop material 30 is gathered, transferred into the baling chamber 32, and then formed into a bale. Depending upon the specific configuration of the baler 24, the bale may be either a rectangular bale, such as a large square bale, or may be a round bale. The specific process and features of the baler 24 used to form the crop material 30 into the bale are well known in the art, are not pertinent to the teachings of this disclosure, and are therefore not describe in detail herein. It should be appreciated that in other embodiments, the harvesting implement 24 may not bale the crop material 30.

Once the data related to the characteristic of the crop material 30 and the position data for each interval has been collected along the initial path 38, a set of estimated values of the characteristic of the crop material 30 throughout the field 26 may then be calculated. The step of calculating the set of estimated values of the characteristic of the crop material 30 is generally indicated by box 128 in FIG. 3. The set of estimated values of the characteristic of the crop material 30 is generated using the sensed characteristic of the crop material 30 and the sensed location of the baler 24 at each of the plurality of intervals. It should be appreciated that the set of estimated values of the characteristic of the crop material 30 through the field 26 may be generated as soon as sufficient data has been collected, and continuously updated through both the initial path 38 and the harvest path 39.

The set of estimated values of the characteristic of the crop material 30 defines an estimate of the characteristic of the crop material 30 based on the measured data from the characteristic sensor 40 and the position sensor 44. It should be appreciated that the set of estimated values are calculated for the entire field 26, or at least a portion of the field 26, using the actual measured data from the characteristic sensor 40 and the position sensor 44. The set of estimated value of the characteristic of the crop material 30 throughout the field 26 may be generated in the form, but not limited to, a table or a predictive mapping of the field 26, both of which may provide estimated values of the crop characteristic at locations on the field 26. The predictive mapping of the file may be defined by modeling the field 26 using the sensed characteristic of the crop material 30 and the sensed location of the baler 24 at each of the plurality of intervals. The manner and form in which the set of estimated values of the characteristic of the crop material 30 is calculated and used by the controller 42 may include any suitable data analysis process that is capable of analyzing the characteristic data and the position data for each interval, and correlating those values into representative estimated values throughout the field 26.

The controller 42 may use the characteristic data from the characteristic sensor 40, and the position data from the position sensor 44 from the initial path 38 to calculate the set of estimated values of the characteristic of the crop material 30. Additionally, the controller 42 may continue to collect characteristic data and position data throughout movement along the harvest path 39 and continuously generate and/or update the set of estimated values of the characteristic of the crop material 30 to provide a more accurate estimate of the characteristic. By using the actual, measured values of the characteristic data and the position data collected while the harvesting system 20 is moving along the harvest path 39, the accuracy of the set of estimated values of the characteristic of the crop material increases. It should be appreciated that the controller 42 may compare the actual measured or sensed values of the crop characteristic to the estimated values of the crop characteristic, and update the model of the estimated crop characteristic accordingly to provide a more accurate estimation of the crop characteristic.

Once the set of estimated values of the characteristic of the crop material 30 in the field 26 has been generated, then the controller 42 may predict a value of the characteristic of the crop material 30 proximate or ahead of the pick-up 28 of the baler 24 as the baler 24 moves along the initial path 38 using the set of estimated values of the characteristic of the crop material 30. The step of predicting the value of the characteristic of the crop material 30 ahead of the pick-up 28 is generally indicated by box 130 in FIG. 3. Because the set of estimated values of the characteristic of the crop material 30 provides an estimated value of the characteristic through the field 26, the controller 42 may use the set of estimated values to continuously predict a value of the characteristic ahead of the baler 24 as the baler 24 moves through the field 26. By doing so, the controller 42 may proactively predict what the value of the characteristic of the crop material 30 will be before the crop material 30 is gathered by the pick-up 28.

While the controller 42 is collecting the position data from the position sensor 44, and the characteristic data from the characteristic sensor 40, while moving along the initial path 38, the controller 42 may control the function 34 of the baler 24 based on the previously defined measured values of the crop characteristic. The controller 42 may continuously determine if the set of estimated values of the crop characteristic has been established or has not yet been established. The step of determining the status of the set of estimated values of the crop characteristic is generally indicated by box 132 in FIG. 3. When the set of estimated values of the crop characteristic is not yet established, generally indicated by arrow 134 in FIG. 3, then the controller 42 may continue to control the function 34 of the baler 24 using the previously defined measured values of the crop characteristic. However, when the set of estimated vales of the crop characteristic is established, generally indicated by arrow 136 in FIG. 3, then the controller 42 may stop controlling the function 34 of the baler 24 with the previously defined values of the crop characteristic, generally indicated by box 138 in FIG. 3.

Once the value of the characteristic of the cop material ahead or in front of the pick-up 28 of the baler 24 has been predicted, the controller 42 may then control or adjust one or more functions of the baler 24 based on the predicted value of the characteristic of the crop material 30. The step of controlling the function of the baler using the predicted value of the characteristic of the crop material 30 is generally indicated by box 140 in FIG. 3. The one or more functions of the baler 24 may be controlled automatically by the controller 42, or may be controlled manually by an operator, based on the predicted value of the crop characteristic. In the example embodiment described herein, the predicted value is a predicted moisture content. Accordingly, the controller 42 may then control the application of crop preservative 36 to the crop material 30 as the crop material 30 is being gathered. By proactively predicting the value of the moisture content of the crop material 30 being gathered, the application rate of the crop preservative 36 may be more accurately applied as needed.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A harvesting system comprising:
a harvesting implement operable to move along an initial path through a field and having a pick-up for gathering crop material as the harvesting implement moves along the initial path;
a moisture sensor positioned to sense a moisture content of the gathered crop material at each of a plurality of intervals;
a position sensor operable to determine a location on the field of the crop material from which the moisture content was sensed at each respective interval;
a controller disposed in communication with the moisture sensor and the position sensor, wherein the controller includes a processor and a memory having characteristic prediction algorithm stored thereon, wherein the processor is operable to execute the characteristic prediction algorithm to:
receive data from the moisture sensor related to the value of the moisture content of the gathered crop at each interval;
receive data from the position sensor related to the location on the field of the crop material from which the moisture content of the gathered crop was sensed at each respective interval;
generate a set of estimated values of the moisture content of the crop material throughout the field based on the data received from the moisture sensor and the position sensor at each of the plurality of intervals;
predict a value of the moisture content of the crop material ahead of the pick-up of the harvesting implement as the harvesting implement moves along a harvest path based on the set of estimated values of the moisture content of the crop material throughout the field; and
control a rate of application of a crop preservative from a preservative applicator of the harvesting implement based on the predicted value of the moisture content of the crop material ahead of the pick-up.

* * * * *